Patented Nov. 20, 1945

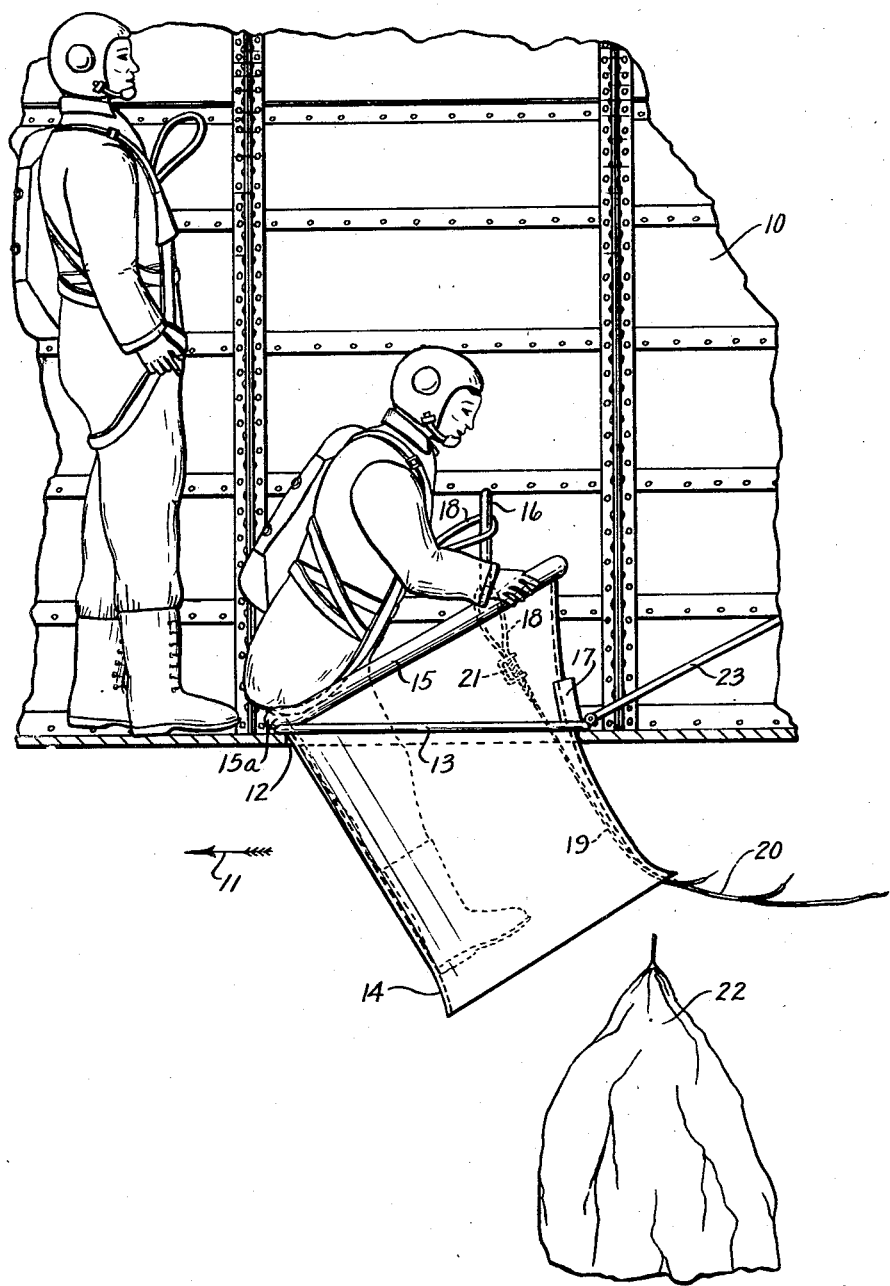

2,389,160

UNITED STATES PATENT OFFICE 2,389,160

AIRPLANE TROOP LAUNCHING MEANS

Frank G. Manson and James J. Maskey,
Dayton, Ohio

Application June 23, 1943, Serial No. 491,884

5 Claims. (Cl. 244—137)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to airplane troop launching means designed particularly for application to military aircraft for use in operations where it is desired to launch members of parachute troops in rapid succession and at low altitudes in comparative safety.

In such operations the parachute troops usually jump through a side door in the fuselage or through a hatch in the bottom of the fuselage, and under either condition the force of the air stream immediately striking the trooper as he passes through the opening to the outside of the fuselage creates the danger of causing the trooper to be forcefully thrown against a protruding portion of the airplane such as a control surface or the like or to have his parachute fouled. In these operations the parachute is caused to be opened by the use of a static line which is attached by the paratrooper to a static line holder on the airplane just prior to his making the jump so that the danger of fouling the parachute just at the moment of launching is considerably increased under such conditions and it therefore becomes highly important to provide means for obviating this condition.

Launching of the parachute troops through a hatch or opening in the bottom of the fuselage of the carrying plane has certain advantages in connection with these operations in that the launching is commenced at a lower point of the fuselage and the paratrooper has a direct drop with less likelihood of striking any protruding part of the plane or of having his parachute fouled thereby. However, as the parachute trooper's legs are extended through the bottom fuselage opening or hatchway preliminary to jumping free of the plane, the air stream strikes the paratrooper's legs forcefully and tends to push them rearwardly and upwardly against the underside of the fuselage. These conditions existing at the time when the paratrooper is preparing to make the jump and just prior to his becoming free of the plane, create disadvantageous psychological factors increasing the hazard and tending to interfere with successful operations, particularly with inexperienced paratroopers.

It is a primary object of this invention to provide the carrying airplane with simple and efficient launching means which will eliminate the foregoing factors interfering with the successful operation and enable the paratroops to jump free of the protruding portions of the carrying plane without being subjected to the force of the air stream under conditions creating the danger of fouling.

Toward the accomplishment of the foregoing object, the invention contemplates provision of a discharge chute positioned adjacent the forward edge of an opening in the bottom of the airplane fuselage and extending downwardly below the fuselage to enable discharge of the paratroops by sliding down the same and serving as a shield forwardly of the jumper at the instant of launching to prevent the impingement of the air stream forces upon the bodies of the paratroopers until they are substantially free of the plane and protruding portions thereof. According to the disclosure of the invention herein the discharge chute preferably comprises a metal tube inclined downwardly and rearwardly, which tube preferably is provided with a padded rail at its upper end secured to or adjacent which is provided a static line holder for engagement of the loops of the static lines attached to the parachutes of each paratrooper.

Within the purview of the invention it is contemplated to make provision for facilitating the emplacing of the discharge chute for the launching operation and for withdrawing the discharge chute into the airplane fuselage under normal flight conditions.

Other objects and advantages and features of novelty will become apparent as the description of the invention proceeds in conjunction with the accompanying drawing in which:

The figure is a partially broken away vertical sectional view through an airplane fuselage and illustrating the discharge means of the invention.

Now referring to the drawing for a detailed description of the invention, the numeral 10 generally designates the fuselage of a troop carrying airplane which is designed to travel in the direction indicated by the arrow at 11, said fuselage being provided with an opening or hatchway 12 in its bottom. Around the opening or hatchway 12 there may be provided a reinforcing tubular or other suitable frame 13. A discharge chute 14 is designed to be positioned, preliminary to troop launching operation, to provide a shield adjacent the forward edge of the opening 12 and extending downwardly from and below the bottom of the fuselage. As illustrated, the discharge chute 14 comprises a metal tube which is inclined downwardly and rearwardly from and with respect to the fuselage 10. The discharge chute 14 is provided with a padded rail 15 at its upper end providing a cushioning hand and body engaging means whereby to enable the paratrooper to steady himself by grasping the same preliminary to making the jump and to cushion the impact of his body with the chute adjacent the upper edge thereof at the instant of jumping.

Within the fuselage and forwardly of the position of the paratrooper's body at the instant of jumping and adjacent the upper end of the discharge tube there is provided a static line holder comprising an upstanding post 16 fixed with respect to the airplane fuselage. Conveniently the static line holder 16 may be secured to the rail 15 at a rearward portion thereof and rearwardly of the position of the paratrooper as he enters the discharge chute so that the static line holder is located directly in front of the paratrooper as he faces rearwardly of the airplane fuselage upon entering the discharge chute.

The discharge chute 14, for the purposes of troop launching operations, is positioned as above-mentioned so that its lower portion extends through the bottom opening or hatchway 12 and the forward portion 15a of the padded rail 15 rests on the floor of the fuselage or upon the frame 13 at the forward edge thereof, the rail 15 being of larger diameter than the top end of the discharge chute 14 and integral therewith and serving as an abutment for engaging the fuselage floor or the frame 13 at the forward edge thereof. A stop or abutment plate 17 is provided on the rearward side of the metal tube comprising the discharge chute 14 to engage the floor of the fuselage or the frame 13 at the rearward edge thereof for the positioning of the discharge chute 14 in operating condition as shown.

In a troop launching operation, with the discharge chute positioned as illustrated, the paratroopers walk rearwardly of the fuselage 10 in succession and enter the discharge chute as illustrated, each paratrooper placing the static line loop 18 over the static line holder 16 in the manner illustrated as he enters the discharge chute 14 and then immediately sliding down through said discharge chute 14 and thence free of the airplane. The static line loop 18 forms a part of the static line 19 which is attached to the parachute rip cord 20. The static line 19 includes a loop positioner 21 attached to the parachute harness in such a manner as to hold the loop in proper position in front of the body of the paratrooper so that the static line loop 18 may be properly engaged by the static line holder 16 as the paratrooper enters the discharge chute 14. It will be understood that in this type of parachute jumping operations, the static line being secured to airplane prior to jumping, the weight of the jumper's body as he passes through the discharge chute 14 serves to pull the rip cord 20 and release the parachute 22 just as the jumper falls free of the discharge chute.

It will be understood that upon the completion of the troop launching operation the discharge chute will be withdrawn from the opening 12 to a position within the fuselage 10 so as to reduce any drag which would otherwise be created by the protrusion of the discharge chute as an obstruction into the air stream. A suitable hatch 23 may be hinged as shown adjacent the rearward edge of the opening 12 so that the latter may be closed by said hatch 23 when the discharge chute 14 is withdrawn into the fuselage for normal flight conditions.

It will be understood that within the purview of the invention it is contemplated that the discharge chute may be hinged to the fuselage adjacent its forward edge such as 15a so that the discharge chute 14 may be swung into retracted position within the fuselage for normal flight conditions.

It will be apparent from the foregoing that the discharge means of the invention provides a shield forwardly of the position of the parachute jumper as he jumps from the airplane so as to shield him from the impact of the force of the air stream until he has dropped substantially free of the airplane and protruding portions thereof, thereby serving to protect the parachute jumper from the hazards of possible fouling, eliminating the mental hazards in connection with the troop launching operation and insuring their successful accomplishment in respect to the launching of large numbers of troops in rapid succession.

Having thus described our invention, what we claim as new and desire to secure by Letters Patent of the United States, is

1. In airplane troop launching means of the class described, the combination with an airplane fuselage having a floor therein and an opening in the bottom thereof, of a rigid discharge tube of a diameter to permit passage of a person's body therethrough, and means for securing said tube in fixed relation to said fuselage with said tube extending downward through said opening and inclined rearwardly of the fuselage with its lower end extending below the fuselage and the forward portion of said lower end disposed rearwardly of the forward portion of the upper end of said tube and the forward portion of the lower end of the tube disposed below the rearward portion of said lower end and with said upper end disposed within the interior of the fuselage and having the forward portion of the upper end of said tube disposed adjacent said floor and the rearward portion of said upper end disposed some distance above the floor, whereby said tube presents an entrance within the fuselage facing forwardly of the fuselage and the rearward portion of the upper end of said tube providing hand engaging means which may be grasped by the hand of a person to steady himself as he enters said tube for discharge therefrom.

2. In airplane troop launching means of the class described, the combination with an airplane fuselage having a floor therein and an opening in the bottom thereof, of a rigid discharge tube of a diameter to permit passage of a person's body therethrough, means for securing said tube in fixed relation to said fuselage with said tube extending through said opening and inclined rearwardly of the fuselage with its lower end extending below the fuselage and the forward portion of said lower end disposed rearwardly of the forward portion of the upper end of said tube and its upper end disposed within the interior of the fuselage and the forward portion of the upper end of said tube disposed adjacent to said floor and the rearward portion of said upper end disposed some distance above said floor, whereby said tube presents an entrance within the fuselage facing forwardly thereof and the rearward portion of the upper end of said tube providing hand engaging means which may be grasped by the hand of a person to steady himself as he enters said tube for discharge therefrom, and an annular padded rail extending around the upper end of said tube and disposed to form a cushioned hand engaging portion therearound and a cushioned seat portion at the forward portion of said tube adjacent said floor.

3. In airplane troop launching means of the class described, the combination with an airplane fuselage having a floor therein and an opening in the bottom thereof, of a rigid discharge tube of a diameter to permit passage of a person's body therethrough, and means for securing said tube in fixed relation to said fuselage with said tube extending downwardly through said opening and inclined rearwardly of the fuselage with its lower end extending below the fuselage and the forward portion of said lower end disposed rearwardly of the forward portion of the upper end of said tube and with said upper end disposed within the interior of the fuselage and having the forward portion of the upper end of said tube disposed adjacent said floor and the rearward portion of said upper end disposed some distance above the floor, whereby said tube presents an entrance within the fuselage facing forwardly of the fuselage and the rearward portion of the upper end of said tube providing hand engaging means which may be grasped by the hand of a person to steady himself as he enters said tube for discharge therefrom, and a static line holder comprising an upstanding post secured to said tube adjacent the hand engaging means at the rearward portion of the upper end of said tube, said static line holder being adapted to loosely receive the static line loop of a parachute.

4. In airplane troop launching means of the class described, the combination with an airplane fuselage having a floor therein and an opening in the bottom thereof, of a rigid discharge tube of a diameter to permit passage of a person's body therethrough, means for securing said tube in fixed relation to said fuselage with said tube extending downwardly through said opening and inclined rearwardly of the fuselage with its lower end extending below the fuselage and the forward portion of said lower end disposed rearwardly of the forward portion of the upper end of said tube and its upper end disposed within the interior of the fuselage and the forward portion of the upper end of said tube disposed adjacent to said floor and the rearward portion of said upper end disposed some distance above said floor, whereby said tube presents an entrance within the fuselage facing forwardly thereof and the rearward portion of the upper end of said tube providing hand engaging means which may be grasped by the hand of a person to steady himself as he enters said tube for discharge therefrom, and an annular padded rail extending around the upper end of said tube and disposed to form a cushioned hand engaging portion therearound and a cushioned seat portion at the forward portion of said tube adjacent said floor, and a static line holder comprising an upstanding post secured to said rail adjacent the rearward portion of the upper end of said tube.

5. In airplane troop launching means of the class described, the combination with an airplane fuselage having a floor therein, and an opening in the bottom thereof, of a rigid discharge tube of a diameter to accommodate the passage of a man's body therethrough, means for securing said tube in fixed relation to said fuselage with said tube extending downwardly through said opening and inclined rearwardly of the fuselage with its lower end extending below the fuselage and the forward portion of said lower end disposed rearwardly of the forward portion of the upper end of said tube and with said upper end disposed within the interior of said fuselage and having the forward portion of the upper end of said tube disposed adjacent said floor and the rearward portion of said upper end disposed some distance above the floor, whereby said tube presents an entrance within the fuselage facing forwardly thereof and the rearward portion of the upper end of said tube providing hand engaging means which may be grasped by the hand of a person to steady himself as he enters said tube for discharge therefrom, an annular padded rail extending around said upper end of said tube and disposed to form a cushioned hand engaging portion therearound and a cushioned seat portion at the forward portion of said tube adjacent said floor, and a static line holder comprising an upstanding post secured to said rail adjacent the rearward portion of the upper end of said tube, said rail being of larger diameter than the chute to provide an abutment at the forward portion thereof adapted to seat adjacent the floor of the fuselage adjacent the forward edge of the opening, and an abutment member provided on the rear side of the tube and adapted to seat adjacent the floor of the fuselage and adjacent the rear edge of the opening to position the chute at the inclined angle specified.

FRANK G. MANSON.
JAMES J. MASKEY.